United States Patent [19]

Menken et al.

[11] Patent Number: 5,026,517

[45] Date of Patent: Jun. 25, 1991

[54] NUCLEAR POWER PLANT WITH WATER OR LIQUID SODIUM COOLANT AND A METALLIC COMPONENT CONTACTING THE COOLANT

[75] Inventors: Günther Menken, Overath; Hans-Jürgen Romeiser, Nuremberg; Josef Steven, Neunkirchen am Brand, all of Fed. Rep. of Germany

[73] Assignee: Siemens Aktiengesellschaft, Munich, Fed. Rep. of Germany

[21] Appl. No.: 579,241

[22] Filed: Sep. 4, 1990

Related U.S. Application Data

[63] Continuation of Ser. No. 263,275, Oct. 27, 1988, abandoned, which is a continuation-in-part of Ser. No. 806,706, Dec. 9, 1985, abandoned.

[30] Foreign Application Priority Data

Dec. 11, 1984 [DE] Fed. Rep. of Germany ....... 3445166
Oct. 28, 1987 [DE] Fed. Rep. of Germany ....... 3736565

[51] Int. Cl.$^5$ .............................................. G21C 3/30
[52] U.S. Cl. .................................. 376/438; 376/304; 376/414; 428/379

[58] Field of Search ............... 376/414, 416, 438, 457, 376/417, 305, 306, 900; 428/379, 386, 469; 427/6

[56] References Cited

U.S. PATENT DOCUMENTS

| | | | |
|---|---|---|---|
| 3,108,936 | 10/1963 | Gale | 376/426 |
| 3,983,303 | 9/1976 | Biermann et al. | 376/900 |
| 4,075,376 | 2/1978 | Jaeger | 428/469 |
| 4,268,586 | 5/1981 | Hanneman et al. | 376/305 |
| 4,297,150 | 10/1981 | Foster et al. | 376/305 |
| 4,541,984 | 9/1985 | Palmer | 376/417 |
| 4,728,488 | 3/1988 | Gillett et al. | 376/900 |

Primary Examiner—Daniel D. Wasil
Attorney, Agent, or Firm—Herbert L. Lerner; Laurence A. Greenberg

[57] ABSTRACT

A nuclear power plant has a water or liquid sodium coolant and a metallic component having surfaces coming into contact with the coolant. A coating is disposed on the surfaces of the metallic component, such as fuel rod cladding tubes or spacer grids. The coating is formed of titanium carbide (TiC), titanium nitride (TiN), zirconium nitride (ZrN), chromium carbide (CrC), titanium aluminum vanadium nitride (TiAlVN), tantalum nitride (TaN), zirconium carbide (ZrC), or tungsten carbide (WC).

40 Claims, 1 Drawing Sheet

NUCLEAR POWER PLANT WITH WATER OR LIQUID SODIUM COOLANT AND A METALLIC COMPONENT CONTACTING THE COOLANT

CROSS-REFERENCE TO RELATED APPLICATION

This application is a continuation of application Ser. No. 263,275, filed Oct. 27, 1988, now abandoned. Ser. No. 263,275 was a continuation-in-part of application Ser. No. 806,706, filed Dec. 9, 1985, now abandoned.

BACKGROUND OF THE INVENTION

1. Field of the Invention

The invention relates to a nuclear power plant with a water or liquid sodium coolant and a metallic component having surfaces coming into contact with the coolant.

2. Description of the Prior Art

While, due to special development work, the metallic materials used for the construction of nuclear power plants, primarily austenitic steels, are more corrosion-resistant and can be activated (for instance, by giving up cobalt content) less strongly or only for shorter periods of time as compared to the materials used in conventional technology, nevertheless it has been found that components of the metallic materials which come into contact with coolant do go into solution in the coolant even if only to a very small extent. In addition to the changes caused thereby, mostly detrimental to the original metallurgical properties, this leads in the area of the reactor cooling loop to an extensive deposit of radioactive materials in the overall loop, which limits its accessibility for servicing and repair. This may involve materials activated at their original location or materials which are activated only in the dissolved state when passing through the fission zone of the nuclear reactor.

Experts have heretofore attempted to counter these detrimental effects by the choice of particularly corrosion-resistant materials or by coating the surfaces subjected to the coolant. For nuclear power plants operated with liquid sodium as the coolant, it has been proposed, for instance, to make the components wetted thereby of a vanadium alloy. This, however, leads to the desired result only if a high degree of purity of the sodium coolant can be assured which necessitates considerable effort for its regular purification. Molybdenum has been used as the coating material, for instance, for the cladding tubes of nuclear fuel rods. However, due to diffusion effects between the coating and the base material (particularly at high temperatures), pores develop in time at the boundary surface between the base material and the coating, whereby the coating is damaged.

In order to facilitate the decontamination work usually required in servicing and repair work due to these effects, one strives from the start to make the surfaces concerned therewith very smooth. This necessitates increased manufacturing costs for the surface treatment.

SUMMARY OF THE INVENTION

It is accordingly an object of the invention to provide a nuclear power plant with water or liquid sodium coolant and a metallic component contacting the coolant, which overcomes the hereinafore-mentioned disadvantages of the heretofore-known devices of this general type. Besides good adhesion to the base material, properties of a coating required for this purpose are high thermodynamic stability and a strongly diffusion-inhibiting effect.

With the foregoing and other objects in view, there is provided in accordance with the invention, a nuclear power plant with a water or liquid sodium coolant and a metallic component having surfaces coming into contact with the coolant, comprising a coating from the group consisting of titanium carbide (TiC), titanium nitride (TiN) or zirconium nitride (ZrN), or chromium carbide (CrC), titanium aluminum vanadium nitride (TiAlVN), tantalum nitride (TaN), zirconium carbide (ZrC) or tungsten carbide (WC) disposed on the surfaces of the metallic component.

In accordance with another feature of the invention, the coating has a thickness of substantially from 0.1 to 20 μm; substantially from 0.1 to 3 μm; or substantially from 2 to 20 μm.

This is done in order to prevent corrosion and diffusion of activated or activatable elements from the structural material of nuclear power plants into the reactor coolant and vice versa.

The materials mentioned are resistant to water and sodium (i.e., the liquids most often used as coolants in nuclear power plants). Coating processes known per se have been used heretofore primarily to provide tools with a protective layer to reduce heavy wear. A somewhat greater layer thickness is naturally of advantage for achieving this effect.

On the other hand, an appreciably smaller layer thickness is sufficient for the purpose provided here of forming a layer impeding the diffusion from the coated base material into the coolant and vice versa, so that according to the invention a thickness of 0.1 to 3 μm is sufficient.

In view of the above-mentioned purpose of the coating to contribute to a reduction of the formation of radioactive products, an expert will naturally apply the coating according to the invention with a purity as high as possible. For this purpose, a number of known processes are available such as spraying-on, vapor deposition, sputtering-on and chemical precipitation; these processes permit the preparation of coatings free of pores.

Decontamination of the pertaining surfaces of the then still remaining radioactive materials coming from other sources can be carried out without difficulty. The surfaces are smooth and there is disposed thereon only adhering but not diffused-in radio nuclides which can be readily removed.

Specifically, in the case of a metal component encompassing a nuclear reactor fuel assembly having fuel rods containing nuclear fuel and structural parts formed of zirconium or a zirconium alloy, the utility of such a nuclear reactor fuel assembly can be improved according to the invention, and its service life in a water-filled pressure vessel of a nuclear reactor can be lengthened.

The invention is also based on the recognition that a surface coating of TiN, TiC, CrC, TiAlVN, TaN, ZrN, ZrC and/or WC on the outside of the zirconium or zirconium alloy structural parts is not only particularly corrosion-resistant in the water or steam at operating temperatures in the pressure vessel of a nuclear reactor, but the resistance of the structural parts to mechanical wear is improved as well. Such mechanical wear occurs not only when the as yet unexposed or unirradiated fuel assembly is assembled, but is also caused by relative motion of structural parts of the fuel assembly during operation in the pressure vessel of a nuclear reactor. In particular, scratching of the outside of zirconium or zirconium alloy cladding tubes of the fuel rods is avoided if these cladding tubes are retracted into the holes in the grid-like spacers while the fuel assembly is being assembled. Similarly, wear of the grid-like zirconium or zirconium alloy spacers during use of the fuel assembly in the pressure vessel of a nuclear reactor can be avoided.

With the objects of the invention in view, there is also provided a nuclear reactor fuel assembly in the form of a metallic component for a nuclear power plant, comprising fuel rods containing nuclear fuel, structural parts formed of zirconium or a zirconium alloy, the structural parts having surfaces coming into contact with a water or liquid sodium coolant, and a coating from the group consisting of titanium carbide (TiC), titanium nitride (TiN), zirconium nitride (ZrN), chromium carbide (CrC), titanium aluminum vanadium nitride (TiAlVN), tantalum nitride (TaN), zirconium carbide (ZrC) and tungsten carbide (WC) disposed on the surfaces of the structural parts.

In accordance with a further feature of the invention, the structural parts are cladding tubes of the fuel rods for the nuclear fuel and spacer grids for the fuel rods.

In accordance with a concomitant feature of the invention, the coating has a thickness of substantially from 0.1 to 20 μm; or substantially from 0.1 to 3 μm; or substantially from 2 to 20 μm.

Other features which are considered as characteristic for the invention are set forth in the appended claims.

Although the invention is illustrated and described herein as embodied in a nuclear power plant with water or liquid sodium coolant and a metallic component contacting the coolant, it is nevertheless not intended to be limited to the details shown, since various modifications may be made therein without departing from the spirit of the invention and within the scope and range of equivalents of the claims.

The invention, however, together with additional objects and advantages thereof will be best understood from the following description of preferred embodiments.

DESCRIPTION OF THE PREFERRED EMBODIMENTS

Figure 1:
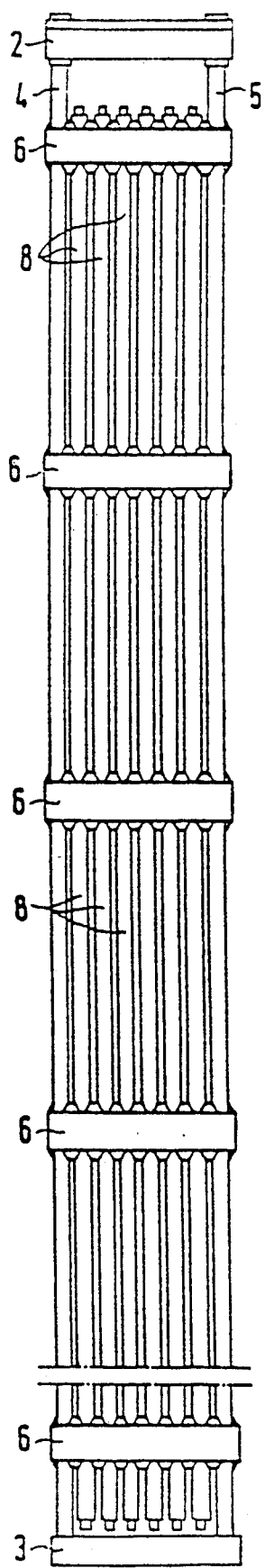
Figure 2:
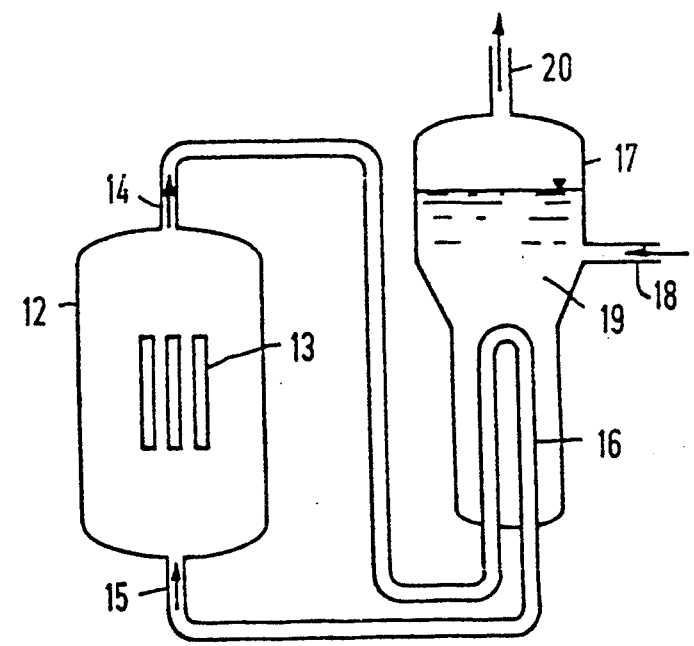

FIG. 1 is a highly diagrammatic, side-elevational view showing a nuclear reactor fuel assembly according to the invention; and FIG. 2 is a schematic circuit diagram of a pressurized water reactor.

Referring now to the figures of the drawing in detail and first, particularly, to FIG. 1 thereof, there is seen a nuclear reactor fuel assembly intended for a pressurized water reactor, which has two square retaining plates 2 and 3 made of steel. There are also seen two parallel steel retaining rods 4 and 5, such as control rod guide tubes, having longitudinal axes which penetrate the two mutually parallel retaining plates 2 and 3 at an angle of 90° and are each screwed firmly to one of the two retaining plates 2 and 3 at a respective end. Each of the two retaining rods 4 and 5 is guided through a hole in square grid-like spacers 6, which are located between the two retaining plates 2 and 3, as viewed in the longitudinal direction of the retaining rods 4 and 5, and are retained on the retaining rods 4 and 5 in a form-locking manner. A form-locking connection is one which connects two elements together due to the shape of the elements themselves, as opposed to a force-locking connection, which locks the elements together by force external to the elements. Fuel rod 8 which are parallel to the retaining rods 4 and 5, are each guided through a respective one of other holes of the grid-like spacers 6. The fuel rods are substantially formed of a nuclear fuel-filled cladding tube closed in a gas-tight manner on both ends. The fuel rods 8 are not secured to either of the two retaining plates 2 and 3. The fuel rods are retained elastically, or in other words in a force-locking manner, by protrusions and springs of the grid-like spacers 6 in the holes of the grid-like spacers 6, and they have play in the direction of the longitudinal axis between the two retaining plates 2 and 3. The fuel rods can therefore expand in the direction of their longitudinal axes, that is, the longitudinal direction of the fuel assembly, without hindrance.

The grid-like spacers 6 and the cladding tubes of the fuel rods 8 are formed of a zirconium alloy, known by the trade name Zircaloy 4, which contains zirconium as well as additional alloy components of from 1.2 to 1.7% by weight of tin, 0.18 to 0.24% by weight of iron, 0.07 to 0.13% by weight of chromium and 0.1 to 0.16% by weight of oxygen, and in which the sum of the percents by weight of the alloy components of iron and chromium is in the range of from 0.28 to 0.37% by weight.

According to the invention, the grid-like spacers 6 and the cladding tubes of the fuel rods 8 have a surface coating of titanium nitride (TiN) on the outer surface thereof, having a thickness on the order of from 2 to 20 μm. Preferably, this thickness is 5 μm.

In order to test the coating, two samples of Zircaloy 4, only one of which had a titanium nitride surface coating with a thickness of 2 μm, were exposed for 116 days in an autoclave in water at a temperature of 350° C. and a pressure of 185 bar. After this period, the increase in weight from oxidation of the sample not having the surface coating was 27 mg/dm$^2$, and that of the sample having the surface coating was only 16 mg/dm$^2$. The corrosion speed for the sample having the surface coating is accordingly virtually only one-half as high as that of the sample lacking the surface coating, so that the service life of the fuel assembly in a nuclear reactor can be approximately doubled by means of the titanium nitride surface coating on structural elements made of Zircaloy 4.

FIG. 2 shows a pressurized water reactor having a pressure vessel 12, in which a reactor core of fuel assemblies 13 according to the invention and as shown in FIG. 1 are disposed. The fuel assemblies have a surface coating of titanium nitride, titanium carbide, chromium carbide, titanium-aluminum-vanadium nitride, tantalum nitride, zirconium nitride, zirconium carbide, or tungsten carbide on the outside of the zirconium or zirconium alloy structural parts. The fuel assemblies 13 are disposed in the reactor core with vertical longitudinal axes.

An outlet 14 of the pressure vessel 12 and thus of the reactor core for liquid water is connected to one end of a primary tube 16 of a steam generator 17, and an inlet 15 of the pressure vessel 12 and thus of the reactor core for liquid water is connected to the other end of the primary tube 16. The primary loop formed by the pressure vessel 12 and the primary tube 16 is closed, so that no steam can form in the primary loop and therefore in the reactor core. Steam does form on the secondary side of the steam generator, which has a delivery fitting 18 for feedwater 19 and an outlet fitting 20 for steam. The steam is carried from the outlet fitting 20 to a non-illustrated steam turbine, for instance.

We claim:

1. Nuclear reactor fuel assembly in the form of a metallic component for a nuclear power plant, comprising fuel rods containing nuclear fuel, structural parts formed of zirconium or a zirconium alloy in the form of cladding tubes of the fuel rods for the nuclear fuel and spacer grids for the fuel rods, said structural parts having surfaces coming into contact with a water or liquid sodium coolant, and a coating from the group consisting of titanium carbide (TiC), titanium nitride (TiN), zirconium nitride (ZrN), chromium carbide (CrC), titanium aluminum vanadium nitride (TiAlVN), tantalum nitride (TaN), zirconium carbide (ZrC) and tungsten carbide (WC) disposed on the surfaces of said structural parts.

2. Fuel assembly according to claim 1, wherein said coating has a thickness of substantially from 0.1 to 20 μm.

3. Fuel assembly according to claim 1, wherein said coating has a thickness of substantially from 0.1 to 3 μm.

4. Fuel assembly according to claim 1, wherein said coating has a thickness of substantially from 2 to 20 μm.

5. Nuclear reactor fuel assembly in the form of a metallic component for a nuclear power plant, comprising fuel rods containing nuclear fuel, structural parts formed of zirconium or a zirconium alloy, said structural parts having surfaces coming into contact with a water or liquid sodium coolant, and a coating from the group consisting of titanium carbide, (TiC) disposed on the surfaces of said structural parts.

6. Fuel assembly according to claim 5, wherein said structural parts are cladding tubes of the fuel rods for the nuclear fuel.

7. Fuel assembly according to claim 5, wherein said structural parts are spacer grids for the fuel rods.

8. Fuel assembly according to claim 5, wherein said coating has a thickness of substantially from 0.1 to 20 μm.

9. Fuel assembly according to claim 5, wherein said coating has a thickness of substantially from 0.1 to 3 μm.

10. Fuel assembly according to claim 5, wherein said coating has a thickness of substantially from 2 to 20 μm.

11. Nuclear reactor fuel assembly in the form of a metallic component for a nuclear power plant, comprising fuel rods containing nuclear fuel, structural parts formed of zirconium or a zirconium alloy, said structural parts having surfaces coming into contact with a water of liquid sodium coolant, and a coating of titanium nitride (TiN) disposed on the surfaces of said structural parts.

12. Fuel assembly according to claim 11, wherein said structural parts are cladding tubes of the fuel rods for the nuclear fuel.

13. Fuel assembly according to claim 11, wherein said structural parts are spacer grids for the fuel rods.

14. Fuel assembly according to claim 11, wherein said coating has a thickness of substantially from 0.1 to 20 μm.

15. Fuel assembly according to claim 11, wherein said coating has a thickness of substantially from 0.1 to 3 μm.

16. Fuel assembly according to claim 11, wherein said coating has a thickness of substantially from 2 to 20 μm.

17. Nuclear reactor fuel assembly in the form of a metallic component for a nuclear power plant, comprising fuel rods containing nuclear fuel, structural parts formed of zirconium or a zirconium alloy, said structural parts having surfaces coming into contact with a water or liquid sodium coolant, and a coating of titanium aluminum vanadium nitride (TiAlVN) disposed on the surfaces of said structural parts.

18. Fuel assembly according to claim 17, wherein said structural parts are cladding tubes of the fuel rods for the nuclear fuel.

19. Fuel assembly according to claim 17, wherein said structural parts are spacer grids for the fuel rods.

20. Fuel assembly according to claim 17, wherein said coating has a thickness of substantially from 0.1 to 20 μm.

21. Fuel assembly according to claim 17, wherein said coating has a thickness of substantially from 0.1 to 3 μm.

22. Fuel assembly according to claim 17, wherein said coating has a thickness of substantially from 2 to 20 μm.

23. Nuclear reactor fuel assembly in the form of a metallic component for a nuclear power plant, comprising fuel rods containing nuclear fuel, structural parts formed of zirconium or a zirconium alloy, said structural parts having surfaces coming into contact with a water or liquid sodium coolant, and a coating of tantalum nitride (TaN) disposed on the surfaces of said structural parts.

24. Fuel assembly according to claim 23, wherein said structural parts are cladding tubes of the fuel rods for the nuclear fuel.

25. Fuel assembly according to claim 23, wherein said structural parts are spacer grids for the fuel rods.

26. Fuel assembly according to claim 23, wherein said coating has a thickness of substantially from 0.1 to 20 μm.

27. Fuel assembly according to claim 23, wherein said coating has a thickness of substantially from 0.1 to 3 μm.

28. Fuel assembly according to claim 23, wherein said coating has a thickness of substantially from 2 to 20 μm.

29. Nuclear reactor fuel assembly in the form of a metallic component for a nuclear power plant, comprising fuel rods containing nuclear fuel, structural pars formed of zirconium or a zirconium alloy, said structural parts having surfaces coming into contact with a water or liquid sodium coolant, and a coating of zirconium carbide (ZrC) disposed on the surfaces of said structural parts.

30. Fuel assembly according to claim 29, wherein said structural parts are cladding tubes of the fuel rods for the nuclear fuel.

31. Fuel assembly according to claim 29, wherein said structural parts are spacer grids for the fuel rods.

32. Fuel assembly according to claim 29, wherein said coating has a thickness of substantially from 0.1 to 20 μm.

33. Fuel assembly according to claim 29, wherein said coating has a thickness of substantially from 0.1 to 3 μm.

34. Fuel assembly according to claim 29, wherein said coating has a thickness of substantially from 2 to 20 μm.

35. Nuclear reactor fuel assembly in the form of a metallic component for a nuclear power plant, comprising fuel rods containing nuclear fuel, structural parts formed of zirconium or a zirconium alloy, said structural parts having surfaces coming into contact with a water or liquid sodium coolant, and a coating of tungsten carbide (WC) disposed on the surfaces of said structural parts.

36. Fuel assembly according to claim 35, wherein said structural parts are cladding tubes of the fuel rods for the nuclear fuel.

37. Fuel assembly according to claim 35, wherein said structural parts are spacer grids for the fuel rods.

38. Fuel assembly according to claim 35, wherein said coating has a thickness of substantially from 0.1 to 20 μm.

39. Fuel assembly according to claim 35, wherein said coating has a thickness of substantially from 0.1 to 3 μm.

40. Fuel assembly according to claim 35, wherein said coating has a thickness of substantially from 2 to 20 μm.

* * * * *